S. BERTI.
MACHINE FOR LOADING HUNTING CARTRIDGES.
APPLICATION FILED NOV. 25, 1907.

986,349.

Patented Mar. 7, 1911.
10 SHEETS—SHEET 1.

Fig. 1

Witnesses:

Inventor
Salvatore Berti
By
James L. Norris
Atty

UNITED STATES PATENT OFFICE.

SALVATORE BERTI, OF RIMINI, ITALY.

MACHINE FOR LOADING HUNTING-CARTRIDGES.

986,349.  Specification of Letters Patent.  Patented Mar. 7, 1911.

Application filed November 25, 1907. Serial No. 403,821.

*To all whom it may concern:*

Be it known that I, SALVATORE BERTI, mechanic, subject of the King of Italy, residing at 28 Via Buffalini, Rimini, Italy, have invented new and useful Improvements in Machines for Loading Hunting-Cartridges, of which the following is a specification.

This invention relates to cartridge loading machines particularly adapted for loading sportsman's cartridges, and the primary object of the same is to provide a machine of this class having a comparatively simple construction and positive operation for advancing empty cartridge shells to a point of supply and filling, and progressively packing, wadding, and crimping or sealing a loaded or filled cartridge, the several empty cartridge shells being rapidly advanced through the machine and effectively loaded and completed for use.

The machine is of such structural organization that it may be used by manufacturers in loading cartridges as well as by individuals requiring speedy and exact work in cartridge loading at a minimum cost.

The invention consists in the construction and arrangement of the several parts which will be more fully hereinafter specified.

In the drawings: Fig. 1$^a$ illustrates a continuation of Fig. 1. Fig. 2$^a$ is a detail sectional elevation of a portion of the mechanism shown by Fig. 2. Fig. 4$^a$ is a plan view of the mechanism shown by Fig. 4. Fig. 4$^b$ is a plan view of that portion of the shell feeding means for preliminarily receiving the shells and directing them into the main feeding means shown by Figs. 4 and 4$^a$. Fig. 4$^c$ is a transverse vertical section on the line A—B, Fig. 4$^a$. Fig. 7$^a$ is a detail view of a part of the filling mechanism shown by Fig. 7. Fig. 8$^a$ is a plan view of the mechanism shown by Fig. 8. Fig. 8$^b$ is an end elevation of the mechanism shown by Figs. 8 and 8$^a$.

The machine embodies an upper table T, an intermediate bed B$^1$ and superposed supplementary table means T$^1$ arranged a suitable distance above the table T and particularly supporting automatically operating filling or loading mechanism for supplying predetermined quantities of powder and shot successively to the shells fed by a step-by-step movement thereunder, wad supplying and inserting means being disposed in operative relation to the filling mechanism to regularly cover and separate the powder from the shot in the shell and to close over the shot prior to the crimping operation as in ordinary shell loading mechanisms.

Owing to the fact that the machine is quite extensive, the several parts thereof have been shown by separate figures so as to illustrate the mechanisms on such scale as to be convenient in ascertaining the construction and operation of the same.

Figure 4:
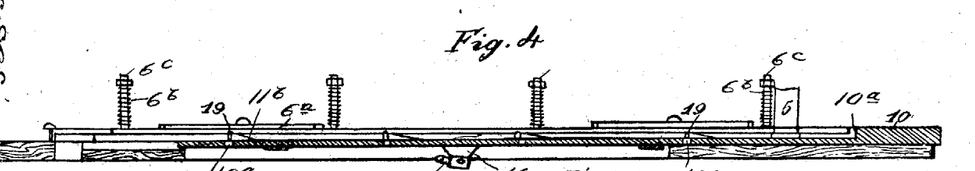
Fig. 4 is a longitudinal sectional view of a portion of the machine and illustrating the shell feeding means for guiding and moving the several shells consecutively under the filling, wadding and crimping mechanism.
Figures 4, 5:
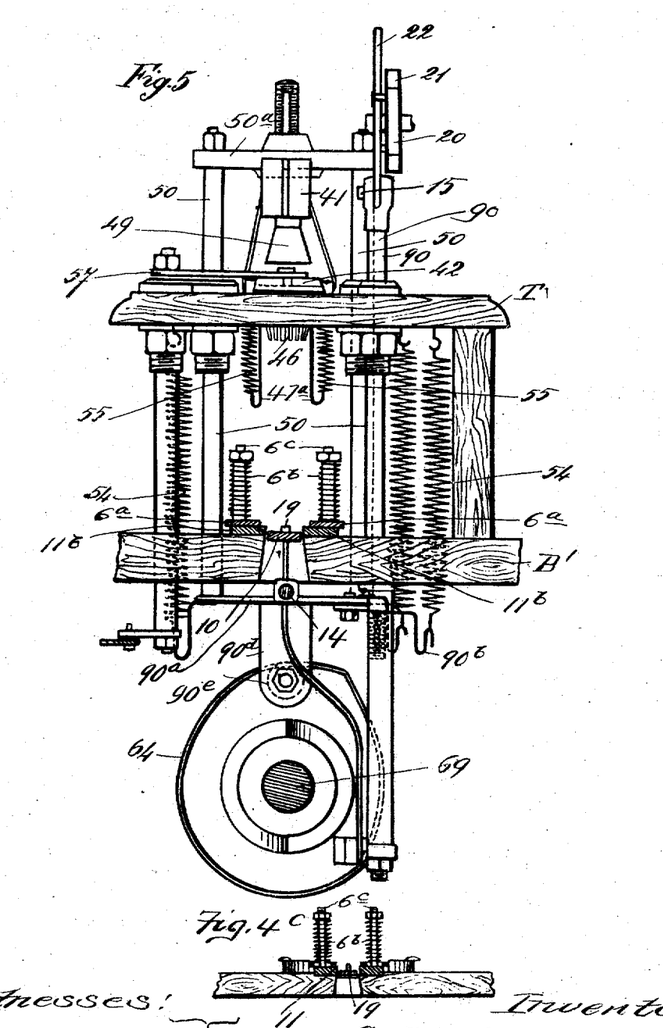
Fig. 5 is a transverse vertical section on the line C—D, Fig. 1$^a$.
Figure 4B:
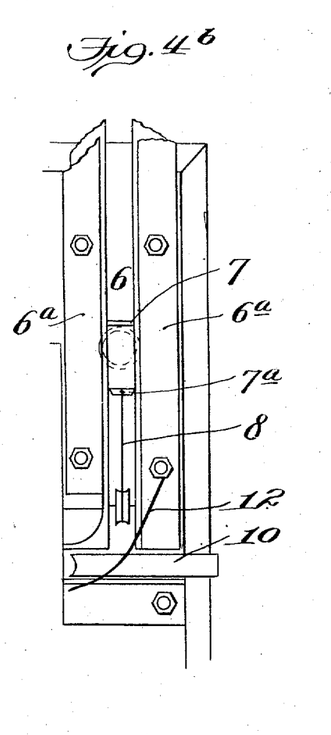
Figures 9, 10:
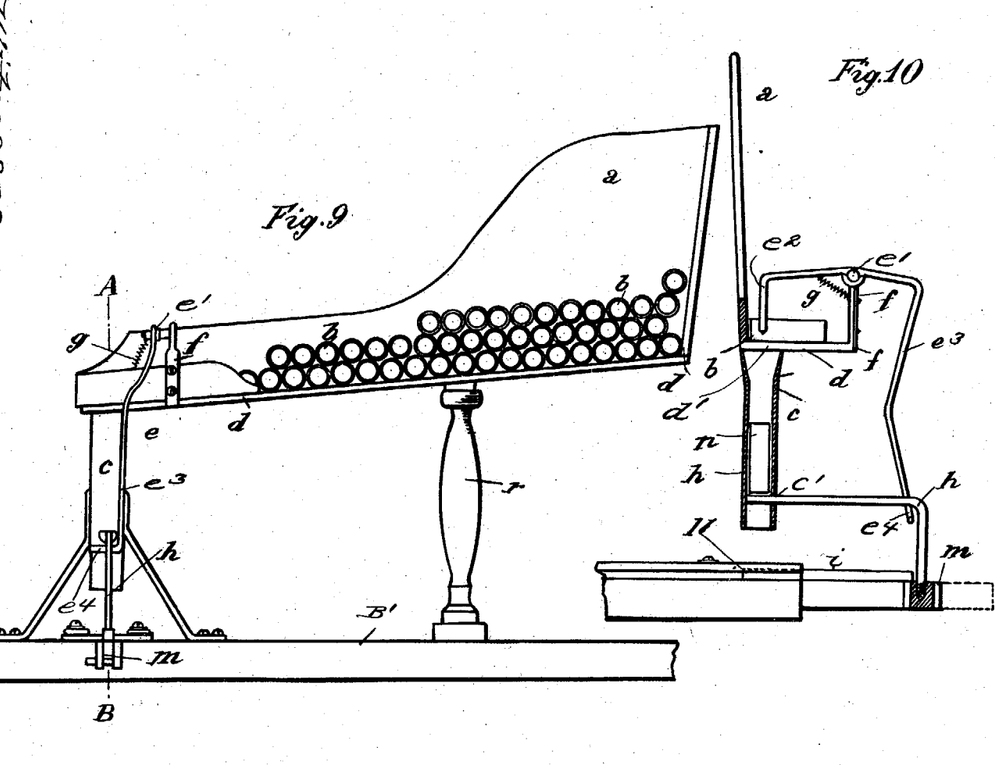
Figs. 9 and 10 are respectively a side elevation and a cross-sectional view of the shell hopper and delivery means for individually supplying the shells to the feeding means of the machine.

The shells are first stacked in horizontal position in a primal supply means, such as the hopper $a$ shown by Fig. 9, and from this hopper the shells are delivered in upright position and individually fed through the machine. The hopper $a$ has an inclined bottom $d$ and is held in elevated position by a column $r$ and provided with an outlet tube $c$ at its lower extremity. The hopper $a$ is supported preferably on a part of the intermediate bed B$^1$ and the lower outlet end of the delivery tube $c$ is disposed over a part of the bed and coöperates with a feeding means, which will be presently specified. The upper extremity of the tube $c$ is enlarged and is fitted over an opening or slot $d^1$ in the lower extremity of the hopper bottom $d$ and the shells in the hopper gravitate toward the said opening or slot. These shells are placed in the hopper in a horizontal position with their closed or rimmed extremities adjacent to the back of the hopper, and when the said shells individually reach the opening or slot $d$ they are automatically upset by the weight of their closed extremities or bases and fall in vertical position into the tube $c$ with their bases lowermost and are held in the said tube and liberated at intervals to a feeding means which will be more fully hereinafter explained. The shells are caused to pass singly into the tube $c$ and the mechanism which controls their individual delivery into and from the tube consists of a release rod $e$ fulcrumed as at $e^1$ on a support $f$ fixed to the hopper side adjacent to the outlet or lower end of the latter. The release rod $e$ has a pendant shell engaging extremity $e^2$ which bears upon and holds individual shells or the stack of shells and liberates one shell at a time, said shell engaging extremity $e^2$ being held down in normal position, as shown by Fig. 10, by a spring $g$ connected to the rod $e$ at a distance inwardly from the fulcrum $e^1$ thereof and also to the outer side of the hopper. The release rod $e$ has an outer depending trip extension $e^3$ terminating in an angular tappet $e^4$. The lower extremity of the trip extension $e^3$ or the tappet $e^4$ coöperates with a sliding catch rod $h$ of angular form having its free extremity movable into and out of the tube $c$ through an opening $c^1$ and operating to temporarily retain the individual cartridges in the tube $c$ and release said cartridges from the tube. The catch rod $h$ is secured to and moves with a slide $m$ which is adapted to be reciprocated from the driving mechanism of the main machine by suitable means and at timed intervals, the said slide having an upper push projection or plate $i$ which coöperates with a grooved guide 11 of the main machine and serving as a feeding means for the several cartridges in relation to the ammunition filling, wad-applying and crimping mechanism which will be hereinafter more fully specified. As the shells are individually delivered from the tube $c$ to the grooved guide 11, they are pushed at regular intervals through the guide by the push-plate $i$ carried by the slide $m$, and this feeding means 11 will be preferably that part of the main feeding means which is laterally extended as shown by Fig. $4^b$, but it is obvious that the delivery or preliminary feed of the shells from the hopper $a$ as just explained might be carried on directly in connection with the main feeding means or guide of the machine. This hopper and the devices coöperating therewith as explained are particularly adapted for a machine used by manufacturers or in large loading factories. In some constructions the machine may be loaded by hand, but it is obvious that the automatically operating hopper will facilitate the supply of shells through the machine.

As hereinbefore indicated, the cartridges are fed into a lateral extension 6 of a longitudinal feeding groove or channel 11, and coöperating with said lateral extension 6 is a sliding carrier 7 having a rear angular member and freely movable in the extension of the feeding groove. This carrier acts as a propelling means for the shells disposed in the lateral groove 6 or entrance of the feeding means, and one or more shells may be actuated by this carrier and drawn thereby into the main feeding groove or means 11 of the machine. The carrier 7 has a front extension $7^a$ to which is attached a cord or analogous device 8 which is trained over a pulley $8^a$ and has a weight 9 on its opposite extremity. The carrier 7 is drawn backwardly against the resistance of the weight and the shell or shells inserted in the groove 6 in advance of said carrier and the carrier then released, the weight by its tendency to lower gradually drawing the carrier toward the main guide groove or means 11 and against a directing spring 12, which is deflected inwardly, as shown by Figs. $4^a$ and $4^b$, to push the cartridges toward the groove or guide means 11 and in advance of a shoulder $10^a$ at the outer end of a slide 10 forming the bottom of the guide means 11 and having at intervals therein upwardly projecting spring-actuated stops 19 movable into openings $19^a$ when depressed to allow the shells to pass thereover but preventing the shells from having a receding or backward movement. Along the opposite sides of the grooves 6 and 11, and contributing to the formation of the grooves are plates $6^a$ and $11^b$ held down in place by springs $6^b$ on posts $6^c$ projecting through the plates, the latter having movement on the posts or capable of a slight elevation to compensate for the movement of the shell bases or rim extremities and institute sufficient friction on the latter to hold the shells in upright position for the several operations to which they are subjected.

The slide 10 is actuated at regular intervals by a connecting rod 14 attached to an ear or lug 16 depending from the slide and also to the upper end of a lever 13 carrying a roller 89 at its lower extremity and operatively supported by a hanger $89^a$ depending from the intermediate bed $B^1$. The roller 89 is held in engagement with spiral cam projections $88^a$ on a cam cylinder 88 fixed on a driving shaft 69, the latter shaft constituting the driving means for the several mechanisms, as will be hereinafter explained, and actuated from a suitable power source as at W. The shaft 69 is supported by suitable hangers or other means from the bed B¹ and the latter has suitable legs, as at B² whereby it is held in stable position on a floor or other surface. The feeding means for the shells embodying the groove 11 and the slide 10, through the actuating means for said slide as just explained, imparts a step-by-step progressive movement with relation to the several ammunition filling wad-inserting and crimping mechanisms at timed intervals, and the shells are regularly replaced when partially filled and wads inserted or when completely filled and crimped by other shells which may be empty or partially filled and completed.

Figure 1:
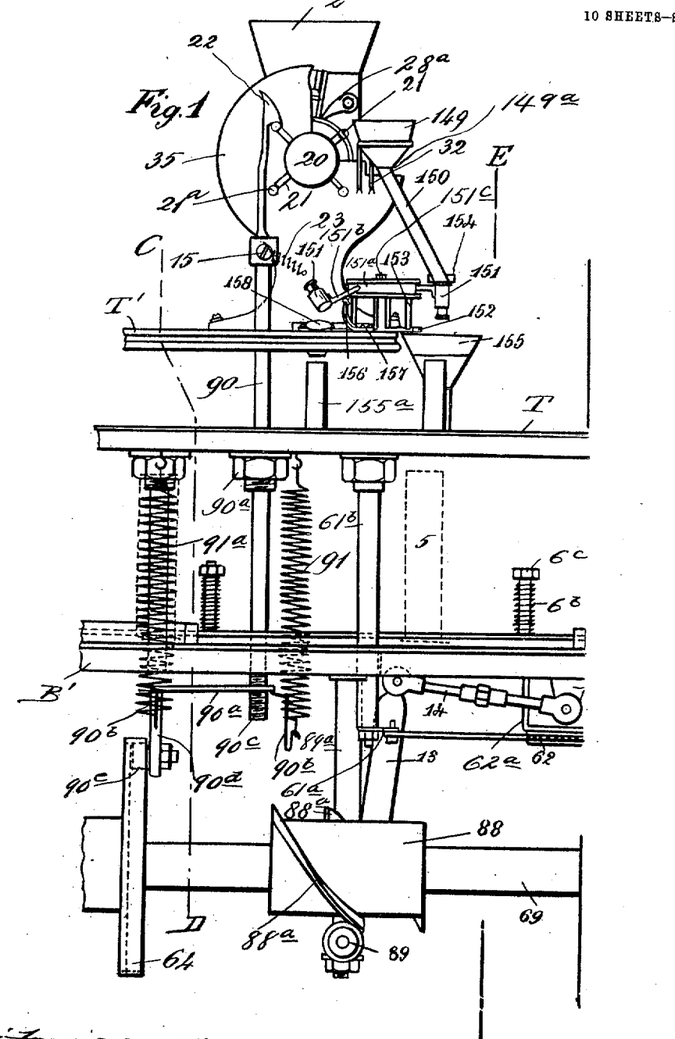
Figure 1 is a side elevation of a portion of the machine embodying the features of the invention.
Figure 1A:
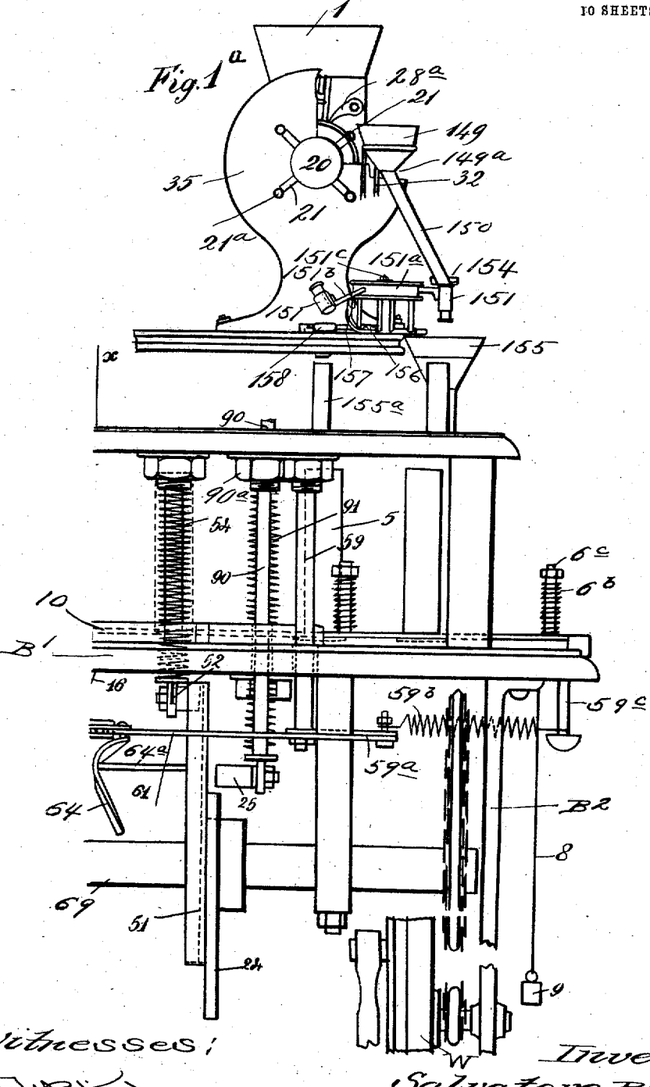
Figure 7:
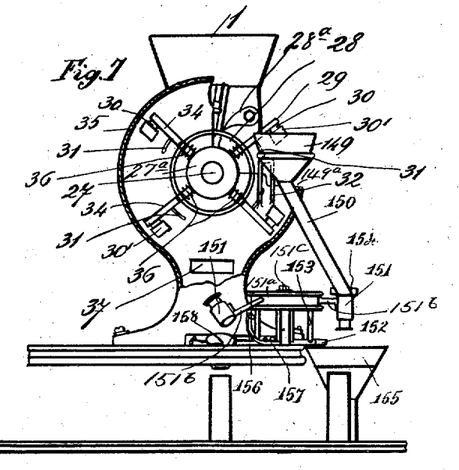
Fig. 7 is a detail sectional elevation of one of the automatically operating filling mechanisms shown by Figs. 1 and 1$^a$.
Figure 7A:
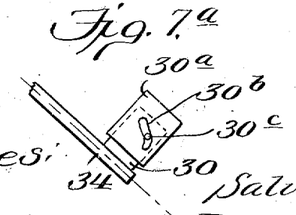
Figure 8:
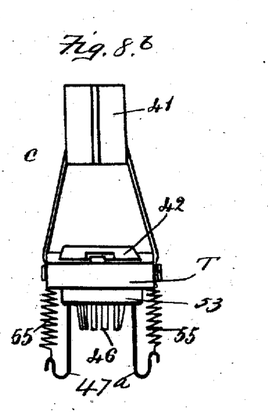
Fig. 8 is a detail longitudinal section showing the wad supply and feeding means.
Figures 8, 8A:
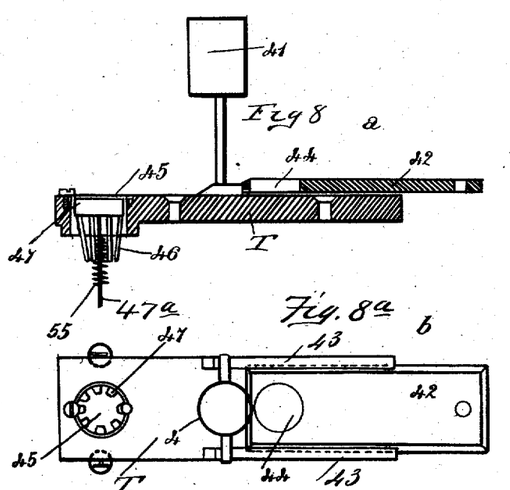

The mechanism for supplying the powder and shot is identical and designated by the letters A and B, Figs. 1ª, 7 and 7ª, and like reference characters are applied to corresponding parts, and a description of one of these mechanisms will suffice for both.

The powder and shot filling mechanisms are disposed on the supplementary table means T¹ and outlet respectively into tubes 155ª supported by and extending through the table T to direct the powder and shot at properly timed intervals into the shells moved thereunder by the feeding means and projecting upwardly from the bed B¹. Each filling mechanism comprises a receptacle 35 having a supply hopper and chute means designated by the numerals 1 and 2 in the respective filling mechanisms A and B, the gunpowder and shot entering the lower basin-like portions of the receptacles through the medium of openings 37, one in each receptacle, and coöperating with each opening 37 is a valve or cut-off 38 having an operating rod 39 extending upwardly in relation to the exterior of the receptacle and readily operative to control the entrance of the powder or shot into the two receptacles, as may be required to maintain a proper supply of the ammunition in the receptacles. Each receptacle 35 is in the main of circular form and has a shaft 27 rotatably disposed therein provided with a hub 27ª. On one end of the shaft 27, exterior of the receptacle, a disk 20 is fixed and provided with a series of four radial arms 21 at diametrically opposite points and terminating in projections 21ª. Extending upwardly through the bed B¹ and tables T and T¹ is a reciprocating rod 90 having a draw dog 22 fulcrumed on its upper end to engage the respective projections 21ª of the arms 21 to impart a step-by-step rotation through the disk 20 to the shaft 27. The draw-dog 22 has sufficient movement to permit it to ride over the successive projections 21ª to operatively place itself, and to maintain the said draw dog in positive operative position or so that it will effectually catch the projections 21ª, a spring 23 is secured to the said dog and the adjacent side of the receptacle 35. The upward movement of the rod 90 is restricted by a stop or nut 90ª thereon which engages the under side of the table T, and held by the lower end of said rod below the table or bed B¹ is a roller 25 which is engaged at intervals by a cam 24 fixed on the shaft 69, the said roller 25 being released regularly from the cam after exerting a downward pull on the rod 90 through the operation of the cam, and said rod is restored to normal position by a spring 91 connected thereto and to the table T. By this interval vertical reciprocation of the rod 90 the shaft 27 is rotated at intervals, and secured to the hub 27ª to have an axial movement is a plurality of arms 34 extending outwardly at diametrically opposite points from the said hub and also engaging a circular keeper or ring 28 arranged concentrically in relation to the hub and serving to positively support the arms. Backward movement of the shaft 27 is obstructed by means of a pawl 28ª engaging the ring or circular support 28 and by this means the said shaft and the arms 34 will be caused to have a regular rotation imparted thereto and the said arms will also rotate within the receptacle 35 from the upper to the lower portion of the receptacle to maintain a positive feeding of the ammunition contained within the lower portion of the receptacle, as will be presently explained. There are four of the arms 34, and each is engaged by a spring 36 which operates to return the arm to normal position after it has been axially moved, and on the free extremity of each arm is a measuring cup or receptacle, shown in enlarged detail by Fig. 7ª, and comprising a tubular body 30 having an adjustable cylinder 30ª applied thereover, the cylinder having a suitable slot 30ᵇ and the body 30 a pin 30ᶜ to form a bayonet joint between the said body and cylinder and whereby the capacity of the cup may be adjusted as may be found necessary and desirable in increasing or decreasing the quantity of powder and shot introduced in each shell. The interior of the receptacle 35 will be rendered accessible by suitable means so that the cups on the arms 34 may be adjusted prior to loading the shells.

On each arm 34 is an arcuate projection 31 to engage and ride over a cam bracket 32 to cause each arm at a certain time in its rotation to be overturned and deposit its contents into a funnel 149 having an angularly deflected tube 150 projecting from the bottom thereof to deposit the powder or shot as taken up from the interior of the respective receptacles 35 into a delivery apparatus which will be more fully hereinafter specified. As the several arms 34 rotate, the cups on the ends thereof are caused to sweep through the ammunition in the lower portions or basins of the respective receptacles 35 and become successively filled. After the cups on the arms 34 are successively overturned to deliver their contents into the funnel 149, the springs 36 come into play and return the arms 34 and cups to normal position. The funnel 149 is positioned within an opening 149ª in the receptacle 35 and stands within the path of movement or adjacent to said path of movement of the cups carried by the said arms 34, and the tube 150 stands at an outward and downward angle of inclination and carries on the lower extremity thereof a scraper blade or analogous device 154.

The delivery apparatus comprises a rotatable horizontally disposed head 151ª, and projecting therefrom is a plurality of axially movable arms 151$^b$ carrying cups 151, the head 151ª being rotated regularly on its axis 151$^c$ by a lever 152 suitably actuated from the remaining mechanism and engaging depending projections 153 carried by the head 151ª. As the head 151ª rotates, the cups 151 are successively brought under the lower outlet end of the tube 150, one of the cups 151 always being under the end of the tube so as to receive the ammunition from said tube. The arms 151$^b$ are overturned at a certain point through the medium of a pivot means 156 striking against the projecting end of a curved or cam member 157, the overturning of the arms and the cups 151 ensuing just as the cups arrive over a delivery opening 158 extending through the table T¹ and under which the upper open end of the tube 155ª is disposed. Under the outlet end of the tube 150 at a suitable distance below the maximum downward projection of each cup 151 is a hopper 155 for receiving surplus ammunition removed from the cups by the scraper 154 or as the said cups move under the scraper, and from the hopper 155 the surplus ammunition passes into a receptacle 5. This same organization and arrangement of elements are embodied in connection with each of the ammunition filling mechanisms, and practically the same operating mechanism for the shot filling mechanism is used with a slight change as to the mode of reciprocating the rod 90 of this latter mechanism.

The devices for reciprocating the rod 90 of the shot filling mechanism B consists of a pull-plate 90ª having terminal spring attaching members 90$^b$ to which the lower ends of springs 91 and 91ª are connected, the upper ends of said springs being secured to the table T. The lower end of the rod 90 for actuating the shot filling mechanism B is screw-threaded as at 90$^c$ and the pull-plate 90ª is adjustably fitted thereover to take up a variation in the tension of the springs 91 and 91ª and also to compensate for lost motion or to modify the stroke of the said rod 90.

An arm 90$^d$ depends from the pull-plate 90ª and carries a roller 90$^e$ on its lower end which is held in continual engagement with an annular cam 64 keyed to the shaft 69. The shape of this cam 64 is such that the pull-plate 90ª and rod 90 attached thereto will be drawn downwardly at intervals and released and the springs 91 and 91ª operate to restore the said parts to normal position or elevate the rod 90 and the catch dog carried thereby.

Figure 6:
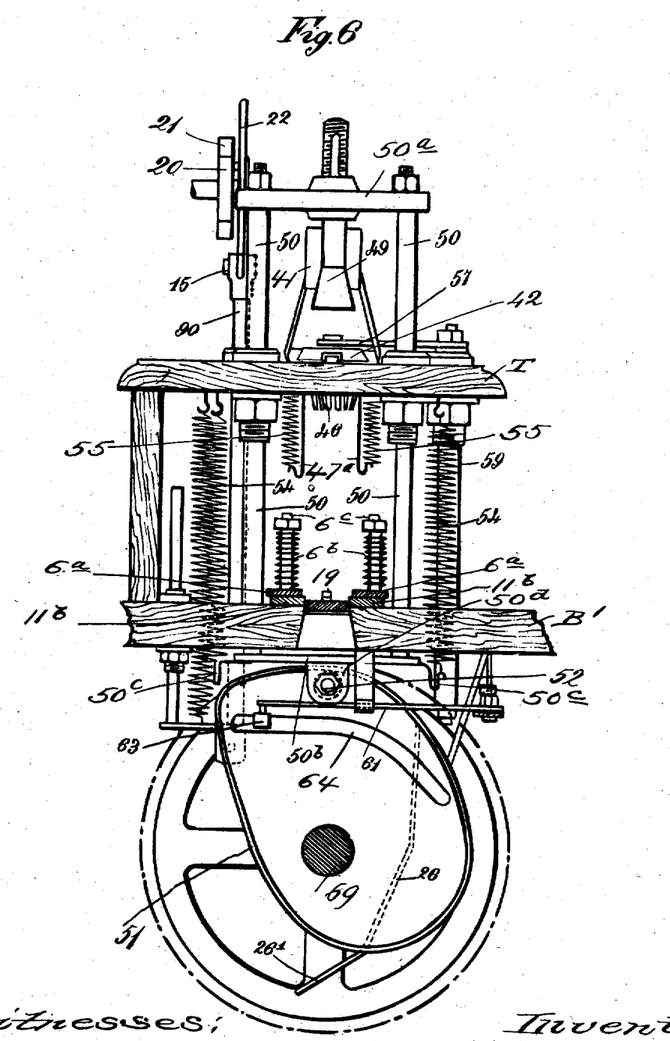
Fig. 6 is a view similar to Fig. 5 taken in the plane of the line E—F, Fig. 1$^a$.

Between the powder filling and shot filling mechanisms A and B, a wad inserting mechanism is disposed and supported on the table T, and immediately following the shot filling mechanism a similar wad inserting mechanism is disposed on the table, both wad inserting mechanisms being practically the same in construction and the first operating to introduce the intermediate or powder covering wad and the second introducing the final or shot covering wad forming the closure for the shell and over which the crimp is made. The table T has an opening 45 in central position relative to opposed guides 43 in which a slide 42 has reciprocating movement, the said slide having at one end a wad pocket 44. Over the path of movement of the slide a wad holder 41 is disposed and therein a number of wads are placed and are fed downwardly, one at a time, to the slide 42 and fall in the pocket 44. The slide 42 is reciprocated through the medium of a vertical shaft 59 depending through the bed B¹ and having a crank 57 secured to its upper end above the table T and also attached to the rear extremity of the said slide, and to the lower end of said shaft a crank 59ª is attached and has a drawing rod 61 also secured thereto, the crank 59ª being operated against the resistance of a spring 59$^b$ attached to a pin or stud 59$^c$ depending from the extremity of the bed B¹. The rod 61 reciprocates in a guide 62 which is horizontally disposed and is secured to the under side of the bed B¹ by an arm 62ª, the end of the rod 61 opposite that attached to the crank 59ª being secured to a swinging link or movable member 61ª held on the lower end of a depending post 61$^b$ secured to the table T and preferably extending through the bed B¹. On the shaft 69 an annular cam 51 is mounted and has the contour particularly shown by Fig. 6, and projecting therefrom is an arm 64ª carrying a cam member 64 which engages a roller 63 depending from the rod 61, the cam member regularly rotating with the cam 51 and coming around into engagement with the said roller 63 at regular intervals so as to actuate the rod 61 and reciprocate the slide 42 to deliver the wad therein into the opening 45 of the table T in timed relation to the wad depressing and inserting mechanism, which will now be explained.

Within the opening 45 a collar 47 is movably mounted and has a plurality of spring fingers 46 depending therefrom and deflected inwardly to reduce the maximum diameter of the group of fingers at their lower extremities to facilitate the entrance of the fingers into the upper open end of the cartridge shell for the purpose of properly placing the wad in the shell over the charge of powder, which has been previously introduced therein by the powder filling means hereinbefore explained. The collar 47 and fingers 46 are depressed against the resistance of springs 55 secured against opposite portions of the under side of the table T and to upturned extremities of rods 47$^a$ depending from diametrically opposite portions of the collar 47. Over the opening 45 a plunger 49 is disposed and held by a cross-head 50$^a$ secured on the upper ends of vertically reciprocating rods 50 movable through the table T and the bed B$^1$ and connected at their lower ends by a coupling plate 50$^b$ having terminal spring connecting arms 50$^c$ to which the lower ends of retractile springs 54 are attached, the upper ends of these springs being attached to the under side of the table T. Depending from the center of the coupling plate 50$^b$ is a hanger 50$^d$ in which is mounted a roller 52 held in engagement with the annular cam 51. The rotation of this cam 51 reciprocates the rod 50 and the cross-head 50$^a$ and causes the plunger 49 to alternately descend and elevate, and in its descent the said plunger moves into the collar 47 and forces the wad a head of the same, the collar and fingers 46 moving downwardly for a short distance or until the said fingers are inserted in the upper open end of the cartridge and a continuation of the descent of the plunger 49 forces the wad through the fingers and presses it against the charge of powder in the shell. When the plunger 49 ascends, it frees itself from the collar 47 and the latter and fingers 46 are restored to normal position by the springs 55. The cam 51 is so constructed that it will at intervals release the roller 52 from downward pull, and at such intervals the springs 54 come into play and draw the coupling plate 50$^b$ upwardly and simultaneously elevate the rods 50 and cross-head 50$^a$ and the said plunger 49.

It will be understood that the reciprocating or wad-feeding slide 42 will operate to dispose a wad in the opening 45 at intervals between the depression of the plunger 49. The mechanism for inserting the wad in the shell or in each shell after the charge of shot has been introduced on the intermediate wad over the charge of powder is similar in all respects, and has an operation in timed relation to the shot filling mechanism B, to the mechanism for introducing the intermediate wad, as just explained. The final wad inserting mechanism is primarily actuated through the cam 64 on the shaft 69 and which also controls the operation of the reciprocating rod 90 of the shot filling mechanism.

Figure 2:
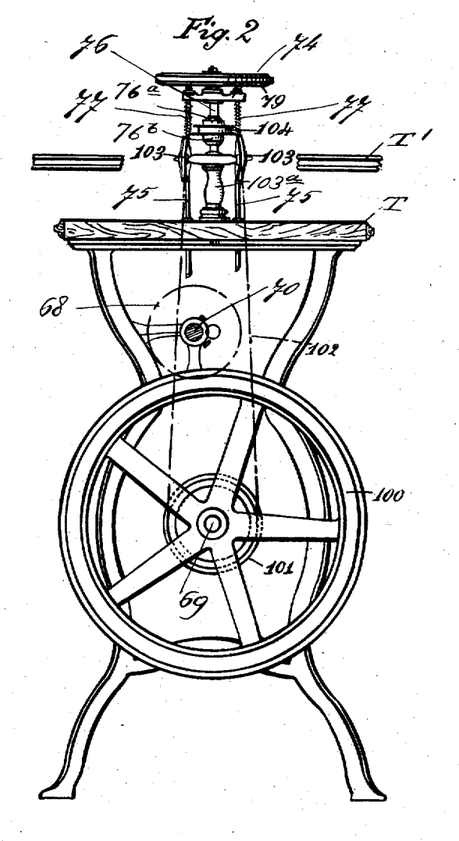
Fig. 2 is an end elevation, partially in cross-section, showing the mechanism for crimping the shells.
Figure 2A:
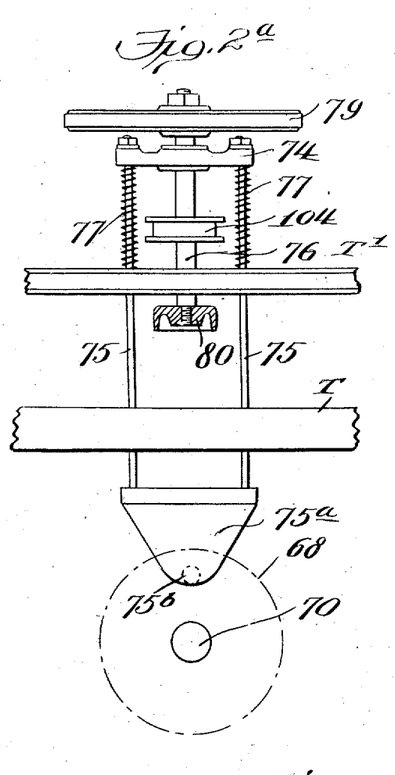
Figure 3:
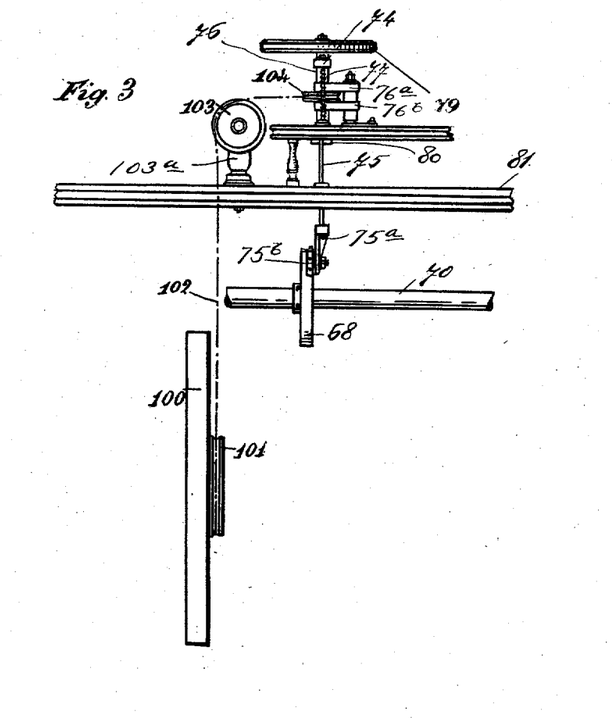
Fig. 3 is a side elevation of a portion of the mechanism shown by Fig. 2 and diagrammatically illustrating the main driving devices therefor.

The final or crimping mechanism forming part of the complete machine is illustrated by Figs. 2, 2$^a$ and 3 and is also operated from the driving shaft 69, the latter, as shown, having a fly-wheel 100 thereon and a band-pulley 101 from which motion is conveyed to the crimping mechanism. This crimping mechanism is supported in the main, for instance, on a part of the table T and the supplementary table T$^1$, or it may be held on an extension of the bed B$^1$ in convenient position for receiving the shells after the final wads are placed therein. If this mechanism for crimping the shells is disposed in operative relation or held on the bed B$^1$, the feeding means for the shells, hereinbefore described, is continued and conveys the shells under the crimping head of the crimping mechanism. Coöperating with this crimping mechanism is a shaft 70 which is suitably actuated, as for instance from the shaft 69, and carries a crank disk 68 of suitable structure and adapted for the purpose. From the band-pulley 101 a belt 102 extends upwardly over a pair of direction pulleys 103 supported by standards 103$^a$, and from these direction pulleys the belt passes around a horizontal pulley 104 fixed on a rotatable and vertically reciprocating shaft 76 carrying a crimping head 80 at its lower end and having a fly-wheel or balancing medium 79 on its upper end. The shaft 76 is held by bearing arms 76$^a$ spaced from each other and secured on an upright 76$^b$, the pulley 104 being held between the said arms. The pulley 104 is fixed on the shaft 76 so far as rotation of the said shaft by the pulley is concerned, but the shaft is free to move through the pulley to bring the crimping head 80 in contact with the upper end of the shell so that successive shells may be rapidly crimped and completed for use. The shaft 76 is reciprocated by a cross-head 74 secured thereto above the pulley 104, and connected to opposite ends of the cross-head are reciprocating rods 75 attached at their lower ends to a coupling member 75$^a$ which engages a crank pin 75$^b$ on the crank disk 68, and by this means the rods 75 are alternately drawn downwardly against the resistance of the springs 77 and released and restored to normal position by said springs. The springs 77 are interposed between the cross-head 74 and a table, which may be a part of the table T$^1$ or the table T in accordance with the position of the crimping apparatus in relation to the remaining part of the machine.

Through the medium of the essential mechanisms as explained hereinbefore, shells may be rapidly loaded and crimped and the dimensions of the machine may be modified to adapt it for use in factories or for domestic use.

The cam means have been incidentally referred to for actuating the several parts, but it will be understood that no great stress is laid upon the cam structures and the operating mechanism as equivalent devices may be substituted. It has been found for all practical purposes that the cam 24 should be shaped as shown by dotted lines as at 26, Fig. 6, and have a projection 26¹ to coöperate with the roller 25 and impart to the latter and the rod 90 carrying the same a downward pull at intervals and a quick release so as to properly actuate the powder filling mechanism.

It will be understood that the details of construction as shown and described may be varied without departing from the spirit of the invention.

What is claimed is:

1. In a machine of the class described, means for feeding cartridge shells progressively in upright position, powder and shot filling mechanisms for the shells spaced from each other and operating at timed intervals to respectively introduce powder and shot in the shells and each comprising a receptacle with a plurality of rotating arms therein carrying cups and provided with a funnel and tube and a delivery apparatus, wad inserting mechanism between the two filling mechanisms, a final wad inserting mechanism operating on the shells immediately subsequent to the introduction of the shot therein, and crimping mechanism for completing the shells and operating thereon after the introduction of the final wads.

2. In a machine of the class described, means provided with a lateral extension for feeding cartridge shells progressively in upright position and having horizontally disposed depressible spring-actuated stops at intervals therein for holding the shells in regular spaced relation, powder and shot filling mechanisms for the shells spaced from each other and operating at intervals to respectively introduce powder and shot in the shells and each comprising a receptacle with a plurality of cups rotatable therein, a rotatable delivery apparatus, and a conveying means between the cups and said delivery apparatus, wad inserting mechanism between the two filling mechanisms, a final wad inserting mechanism operating on the shells immediately subsequent to the introduction of the shot therein, and crimping mechanism for completing the shells and operating thereon after the introduction of the final wads.

3. In a machine of the class described, means for feeding cartridge shells progressively in upright position by a step-by-step movement, powder and shot filling mechanisms for the shells spaced from each other and operating at timed intervals to respectively introduce powder and shot in the shells, the powder and shot filling mechanisms having a similar organization and each comprising a receptacle having rotatable cups therein, a rotatable delivery mechanism for measuring the exact quantity desired, and a conveying means between the cups and the delivery mechanism, wad inserting mechanism between the two filling mechanisms and including a reciprocating means and a plunger for pressing the wads into the shells at proper intervals, a final wad inserting mechanism operating on the shells immediately subsequent to the introduction of the shot therein, crimping mechanism for completing the shells and operating thereon after the introduction of the final wads, and devices for operating the said means and mechanisms and including a single drive shaft primarily controlling the actuation of all the instrumentalities of the machine.

4. In a machine of the class described, means for feeding cartridge shells progressively in upright position, powder and shot filling mechanism for the shells spaced from each other and operating at timed intervals to respectively introduce powder and shot into the shells and each having rotatable feeding cups, adjustable measuring cups, and means for operating the cups to regulate the quantities of powder and shot introduced in the shells, intermediate and final wad inserting mechanism positioned between the filling mechanisms and adjacent to the shot filling mechanism and having yielding means projectable into the shells and a wad feeding means including a plunger for depressing the wads through the yielding means into the shells, and crimping mechanism for completing the shells and operating thereon after the introduction of the final wads and having a rotating vertically reciprocating shaft carrying a crimping head.

In testimony whereof I have signed my name to this specification in the presence of two subscribing witnesses.

SALVATORE BERTI.

Witnesses:
JAMES E. DUNNING,
M. SIENDORFE, Jr.

---

Copies of this patent may be obtained for five cents each, by addressing the "Commissioner of Patents, Washington, D. C."